(12) United States Patent
Zhang et al.

(10) Patent No.: US 8,089,756 B2
(45) Date of Patent: *Jan. 3, 2012

(54) FASTENER FOR EXTERNAL KEYPAD FOR PORTABLE ELECTRONIC DEVICE

(75) Inventors: Xu-Ri Zhang, Shenzhen (CN); Ye Liu, Shenzhen (CN); Rui-Hao Chen, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 1040 days.

This patent is subject to a terminal disclaimer.

(21) Appl. No.: 11/964,866

(22) Filed: Dec. 27, 2007

(65) Prior Publication Data

US 2009/0102684 A1      Apr. 23, 2009

(30) Foreign Application Priority Data

Oct. 17, 2007   (CN) .......................... 2007 1 0202102

(51) Int. Cl.
*G06F 1/16*      (2006.01)

(52) U.S. Cl. ....................... 361/679.56; 341/32; 400/279
(58) Field of Classification Search ............. 361/679.56, 361/679.09, 679.11, 679.12, 679.13, 679.14, 361/679.17; 400/279, 706, 582; 335/207, 335/7; 200/521; 455/550.1, 556.2; 705/39, 705/79; 345/1.1, 168, 175
See application file for complete search history.

(56) References Cited

U.S. PATENT DOCUMENTS

2009/0115641 A1 *   5/2009   Zhang et al. ..................... 341/22
* cited by examiner

*Primary Examiner* — Hung Duong
(74) *Attorney, Agent, or Firm* — Altis Law Group, Inc.

(57) ABSTRACT

A fastener (35) includes a base (33), an orientation block (36), a located block (37) and two magnets (38, 39). The base includes a mounting portion (40) and a securing portion (50). The orientation block is slidably and rotatably connected to the securing portion. The located block is rotatably engaged in the mounting portion. One of the two magnets is disposed adjacent to the securing portion, the other magnet is disposed in the located block. The two magnets are attracted to each other configured for adjusting a distance between the orientation block and the located block.

14 Claims, 7 Drawing Sheets

FASTENER FOR EXTERNAL KEYPAD FOR PORTABLE ELECTRONIC DEVICE

BACKGROUND OF THE INVENTION

1. Field of the Invention

The present invention relates to fasteners and, particularly, to a fastener for an external keypad to be fixed to portable electronic devices such as mobile phone, personal digital assistant (PDA), and so on.

2. Discussion of the Related Art

With the development of wireless communication and information processing technologies, portable electronic devices are ubiquitous. Consequently, add-ons or accessories for these devices are widespread. One such accessory is an external keypad. The need for external keypads is because the on-board keypad may be too small or may not have the desired function keys of the user.

Although an external keypad may greatly improve the information input speed, a conventional external keypad does not provide a fastener used for fixing the external keypad to the portable electronic device. In use, the external keypad is only placed on the portable electronic device, and is not be fixed. Therefore, the external keypad is unstable and accordingly, the external keypad is easy to be fall off from the portable electronic device.

Therefore, a new fastener that is able to fix an external keypad to a portable electronic device is desired.

SUMMARY OF THE INVENTION

One embodiment of the fastener includes a base, an orientation block, a located block and two magnets. The base has a mounting portion and a securing portion. The orientation block is slidably and rotatably connected to the securing portion. The located block is rotatably engaged in the mounting portion. One of the two magnets is disposed adjacent to the securing portion, the other magnet is disposed in the orientation block, the two magnets being attracted to each other and is configured for adjusting a distance between the orientation block and the located block.

Other advantages and novel features of the present fastener will become more apparent from the following detailed description thereof when taken in conjunction with the accompanying drawings.

BRIEF DESCRIPTION OF THE DRAWINGS

Many aspects of the fastener can be better understood with reference to the following drawings. The components in the drawings are not necessarily drawn to scale, the emphasis instead being placed upon clearly illustrating the principles of the present fastener. Moreover, in the drawings, like reference numerals designate corresponding parts throughout the several views, in which.

DETAILED DESCRIPTION OF THE INVENTION

Figure 1:
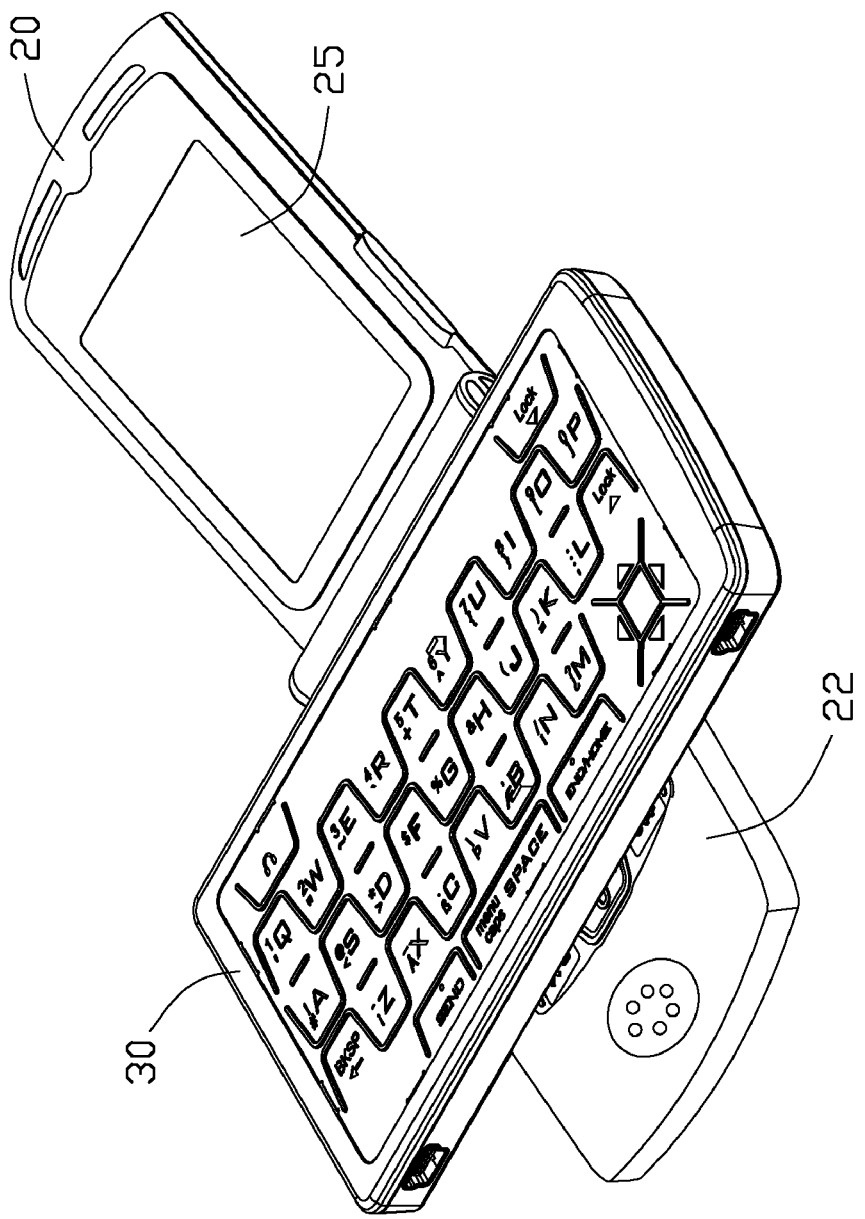
FIG. 1 is an isometric view of a portable electronic device with an external keypad.
Figure 2:
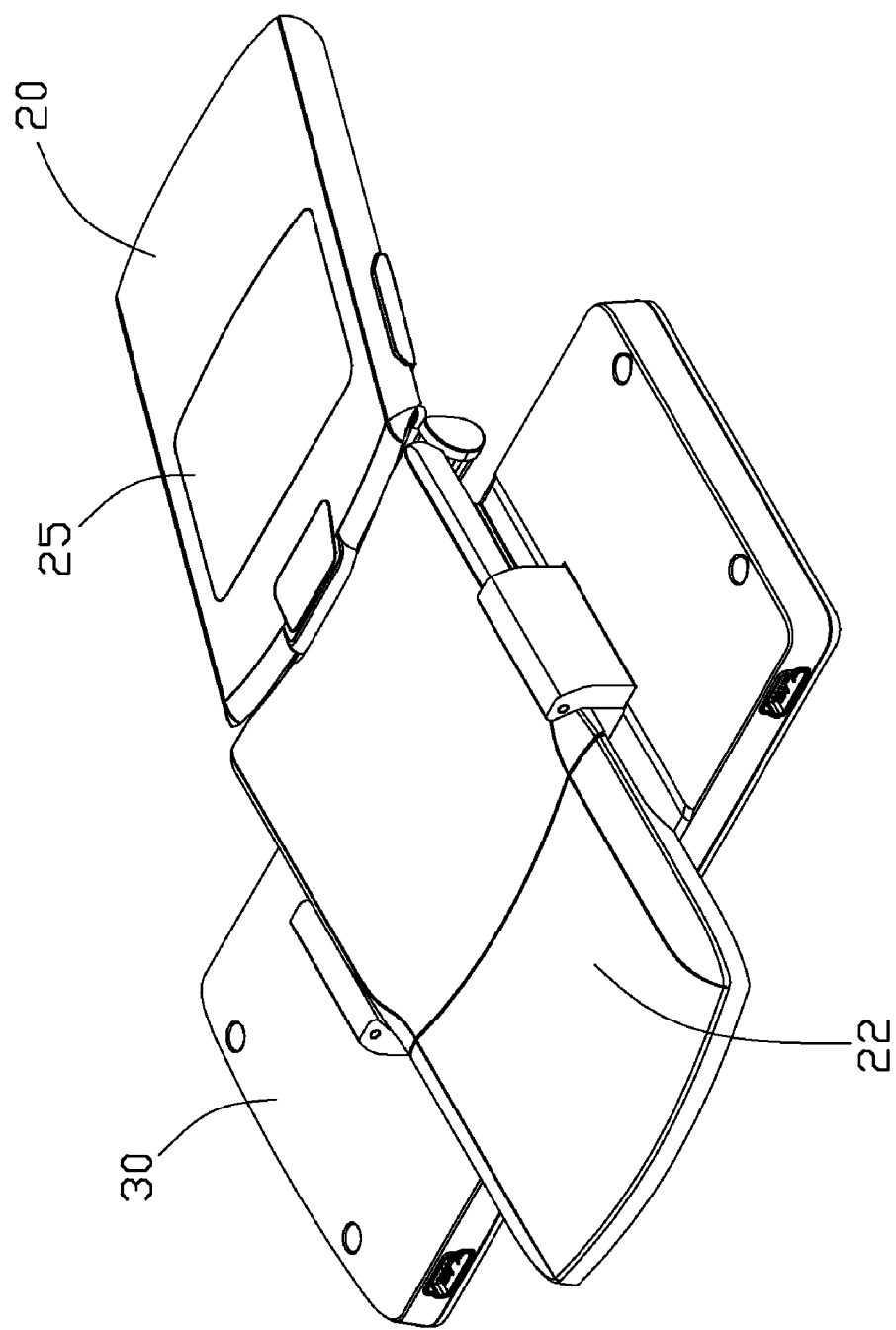
FIG. 2 is similar to FIG.1, but viewed from another aspect.

The present fastener, in one illustrated embodiment, is disposed on an external keypad configured for clamping the external keypad to a portable electronic device such as a mobile phone, personal digital assistant (PDA) and so on. Understandably, the fastener may be advantageously used for other situations. Referring to FIGS. 1 and 2, an external keypad 30 is connected to a mobile phone 20. The mobile phone 20 includes a body section 22 and a cover section 25 which are rotatably interconnected with a hinge. The external keypad 30 grips the body section 22 of the mobile phone 20. The user may operate the external keypad 30 with both hands, thereby greatly improving data input speed.

Figure 3:
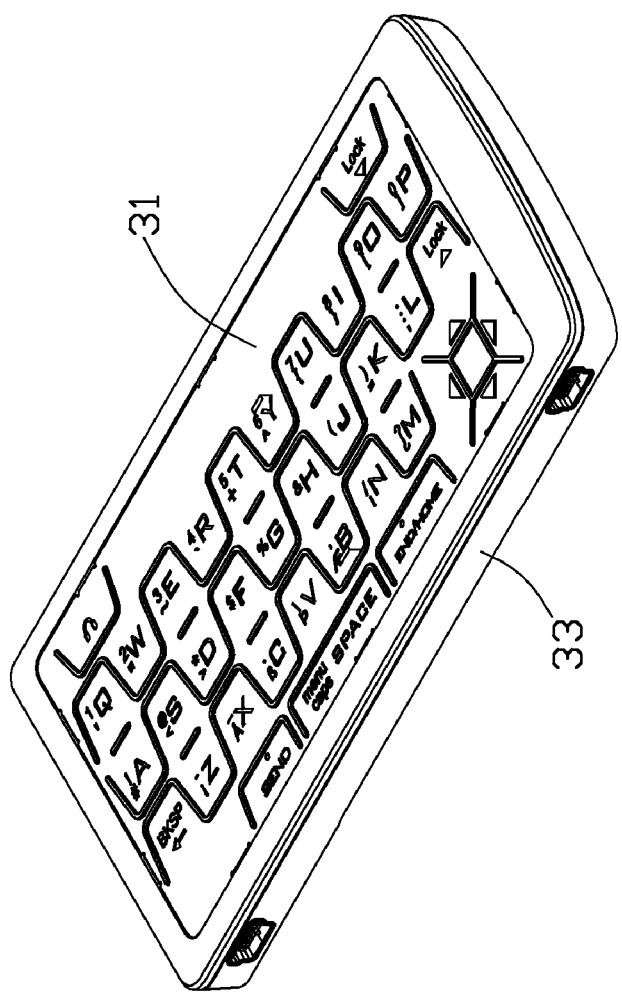
FIG. 3 is an assembled view of the external keypad with a fastener.
Figure 4:
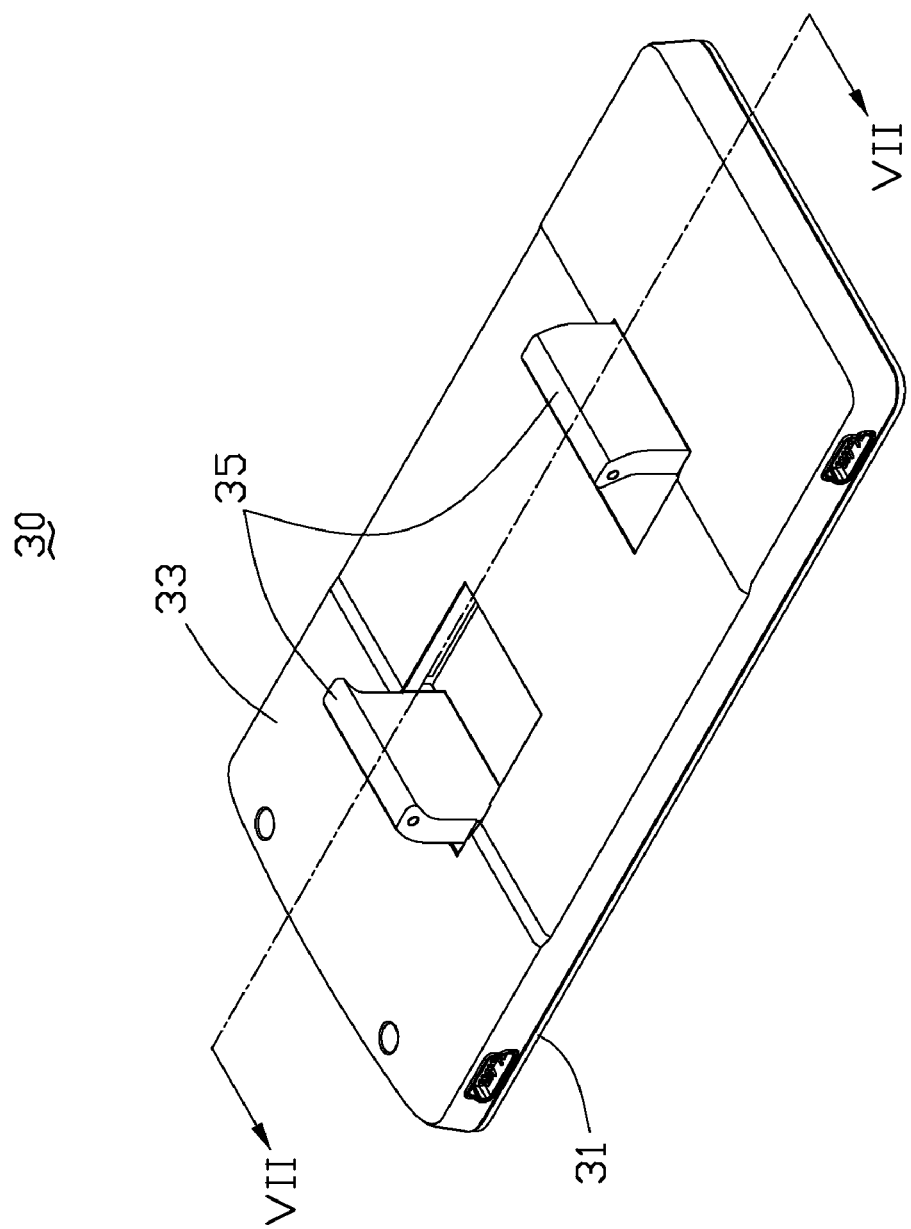
FIG. 4 is similar to FIG.3, but viewed from another aspect.

Referring to FIGS. 3 and 4, the external keypad 30 is a qwerty keyboard, which is similar to a keyboard of a computer. The external keypad 30 includes a key module 31, a base 33 and a fastener 35. The key module 31 is configured for being assembled into the base 33, and the fastener 35 is attached to the base 33. The fastener 35 is used for clamping the external keypad 30 to the mobile phone 20.

Figure 5:
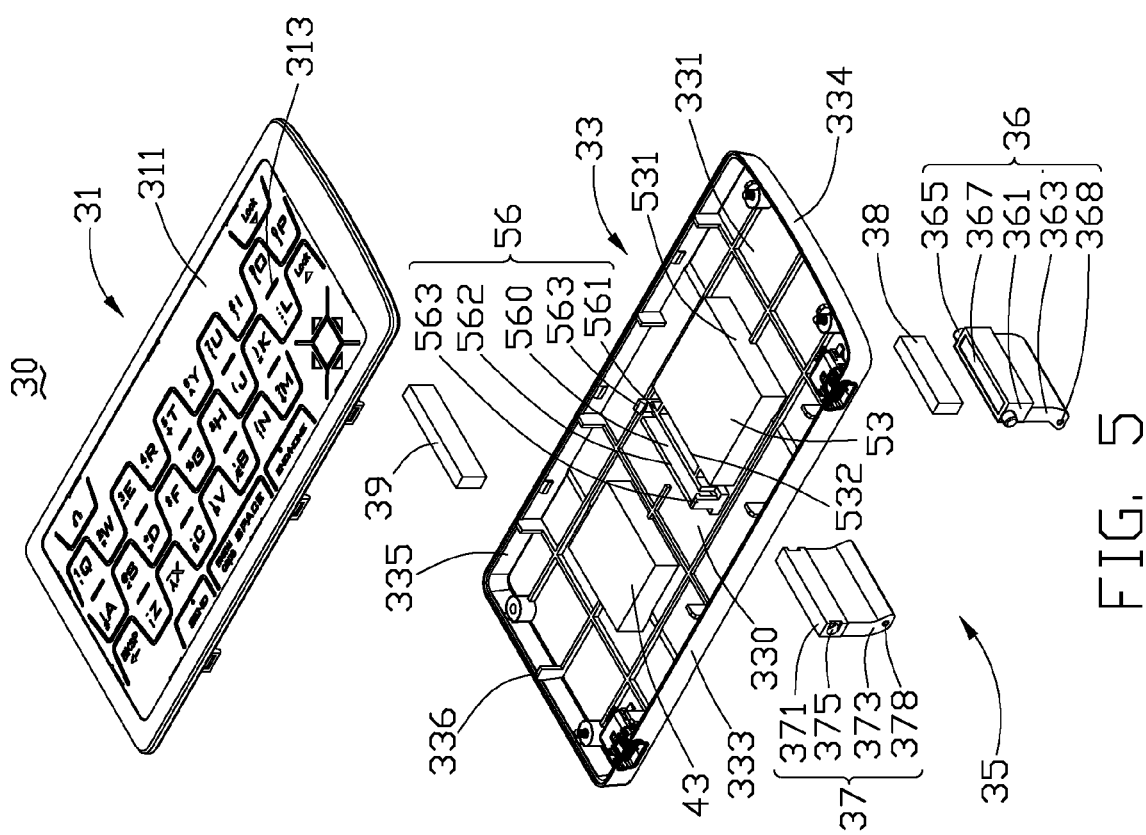
FIG. 5 is an exploded, isometric view of one embodiment of the external keypad of FIG. 3.
Figure 6:
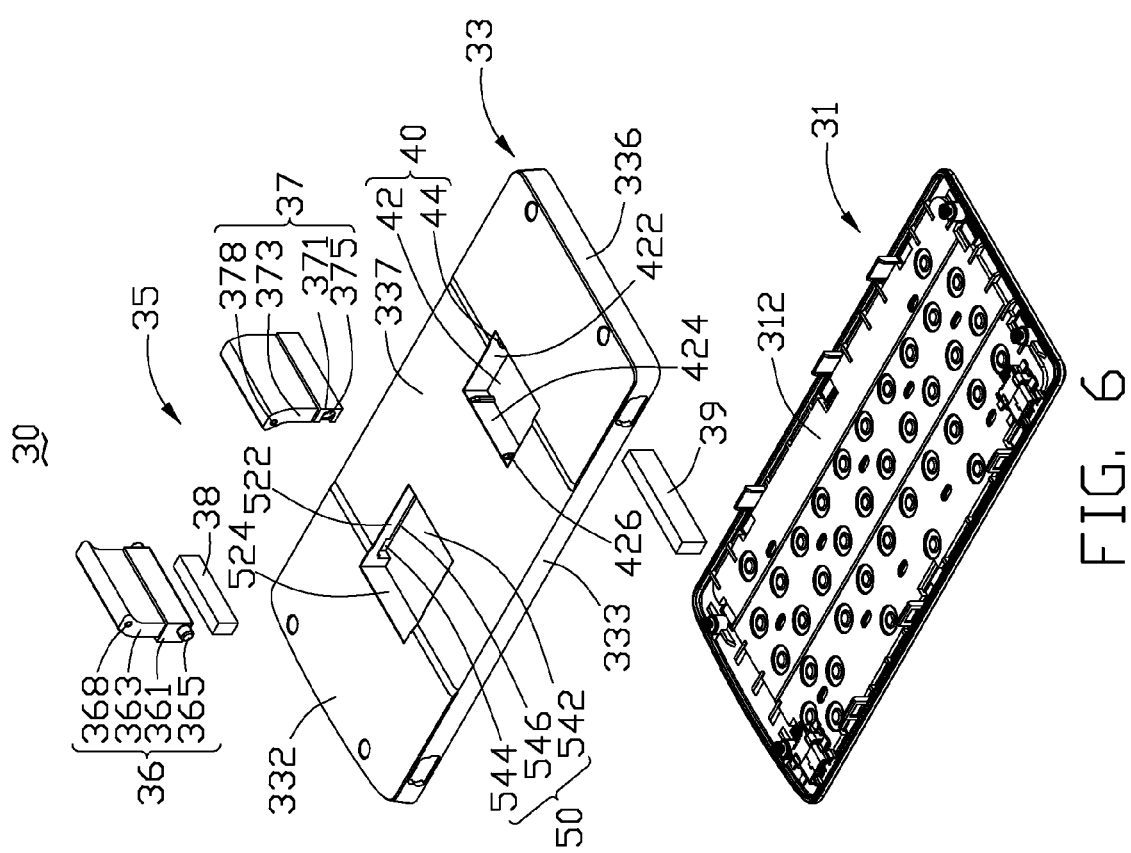
FIG. 6 is similar to FIG.5, but viewed from another aspect.

Referring to FIGS. 5 and 6, the key module 31 is substantially rectangular, and includes a first surface 311 and a second surface 312 opposite to each other. The first surface 311 of the key module 31 includes a plurality of keys 313 thereon.

The base 33 is substantially rectangular configured for matching the shape of the key module 31 so that the base 33 and the key module 31 may be assembled together. The base 33 includes an inner surface 331 and an outer surface 332. The base 33 perpendicularly extends a first sidewall 333, a second sidewall 334, a third sidewall 335 and a fourth sidewall 336 along four edges of the inner surface 331. The first sidewall 333 is parallel to the third sidewall 335. The second sidewall 334 is parallel to the fourth sidewall 336. The first sidewall 333, the second sidewall 334, the third sidewall 335 and the fourth sidewall 336 with the inner surface 331 cooperatively define a cavity 330. The outer surface 332 has a recessed portion 337 formed in a middle area thereof. A width of the recessed portion 337 is slightly larger than that of the body 22 of the mobile phone 20, so as to receive the body 22 of the mobile phone 20.

The fastener 35 includes a mounting portion 40, a securing portion 50, an orientation block 36, a located block 37, a first magnet 38 and a second magnet 39.

The mounting portion 40 is disposed in an edge of the recessed portion 337 toward the fourth sidewall 336. The securing portion 50 is disposed in an opposite edge of the recess portion 337 toward the second sidewall 334. The mounting portion 40 is aligned with the securing portion 50.

The mounting portion 40 intersects with the inner surface 331 and the outer surface 332 of the base 33. The mounting portion 40 defines a receiving groove 42 at the side of the outer surface 332, and forms a protrusion block 43 at the side of the inner surface 331. The receiving groove 42 is cooperatively defined by two sidewalls 422 and two end walls 424. The protrusion block 43 extends from the inner surface 331. The protrusion block 43 forms a post 44 at each sidewall 422 of the receiving groove 42. The two posts 44 are opposite to each other. One of the end walls 424 forms two protuberances 426. The protuberances 426 are spaced from each other.

The securing portion 50 intersects with the inner surface 331 and the outer surface 332 of the base 33. The securing portion 50 defines a latching groove 52 at the side of the outer surface 332, and forms a latching block 53 at the side of the inner surface 53. Each latching groove 52 is substantially rectangular, and is defined by two sidewalls 522 and two end walls 524. Two sidewalls 522 respectively define a cutout 544 and a sliding groove 546. The cutout 544 communicates with the sliding groove 546. A width of the cutout 544 is higher than that of the sliding groove 546.

A latching portion 56 is disposed adjacent to the second end 532 of the latching block 53. The latching portion 56 includes a first plate 561, a second plate 562 and two spaced hooks 563. Two connecting plates 564 are extending from the second end 532 of the latching block 53, and are connected to the first plate 561. The first plate 561 and the second plate 562 are parallel to the second end 532 of the latching block 53, and are respectively disposed at two sides of the two hooks 563. The first plate 561 and the second plate 562 with the two hooks 563 cooperatively define a rectangular receiving space 560 configured for receiving a second magnet 39.

The orientation block 36 may be slidably and rotatably engaged into the securing portion 50. The orientation block 36 includes a main body 361 and a bended portion 363. The bended portion 363 is integrally formed with the main body 361. A width of the main body 361 is similar to that of the latching groove 52 configured for being received in the latching groove 52. The bended portion 363 is substantially arcuate. In this illustrated embodiment, the bended portion 363 is made of flexible material such as rubber. The main body 361 may be made of hard material such as Acrylonitrile Butadiene Styrene (ABS). The ABS material is one kind of plastics. The bended portion 363 with the main body 361 is formed with double molding. Two guiding cylinder 365 respectively extend from two sides of the main body 361. A diameter of the guiding cylinder 365 is slightly smaller than that of the sliding groove 546, thus the guiding cylinder 365 may slide along the sliding groove 546. Two projections 368 extend from two sides of the bended portion 363 and the two projections 368 are configured for elastically engaging with the receiving groove 42.

The located block 37 is configured for slidably being engaged with the securing portion 40. The size and the shape of the located block 37 are corresponding to those of the receiving groove 42 and configured for being received in the receiving groove 42. The located block 37 includes a body 371 and a deformed portion 373. The deformed portion 373 is integrally formed with the body 371. In this illustrated embodiment, the deformed portion 373 is made of flexible material such as rubber. The body 371 may be made of hard material such as Acrylonitrile Butadiene Styrene (ABS). The deformed portion 373 with the body 371 is formed with double molding. The body 371 defines two containing grooves 375 at two sides thereof. The two posts 44 may respectively be received in a corresponding containing groove 375. Two protrusions 378 extend from two sides of the deformed portion 363, the two protrusions 378 are configured for elastically engaging with the receiving groove 52.

The first magnet 38 and the second magnet 39 are substantially rectangular. The first magnet 38 may be received in the aperture 367 of the orientation block 36. The second magnet 39 may be received in the receiving space 560.

In assembly, the first magnets 38 are fixed in the aperture 367 of the orientation block 36. Then, the second magnet 39 is fixed into the receiving space 560 of the latching portion 56. The magnets are oriented to face each other such that the magnetic pole of the first magnet 38 is opposite to the magnetic pole of the second magnet 39.

Figure 7:
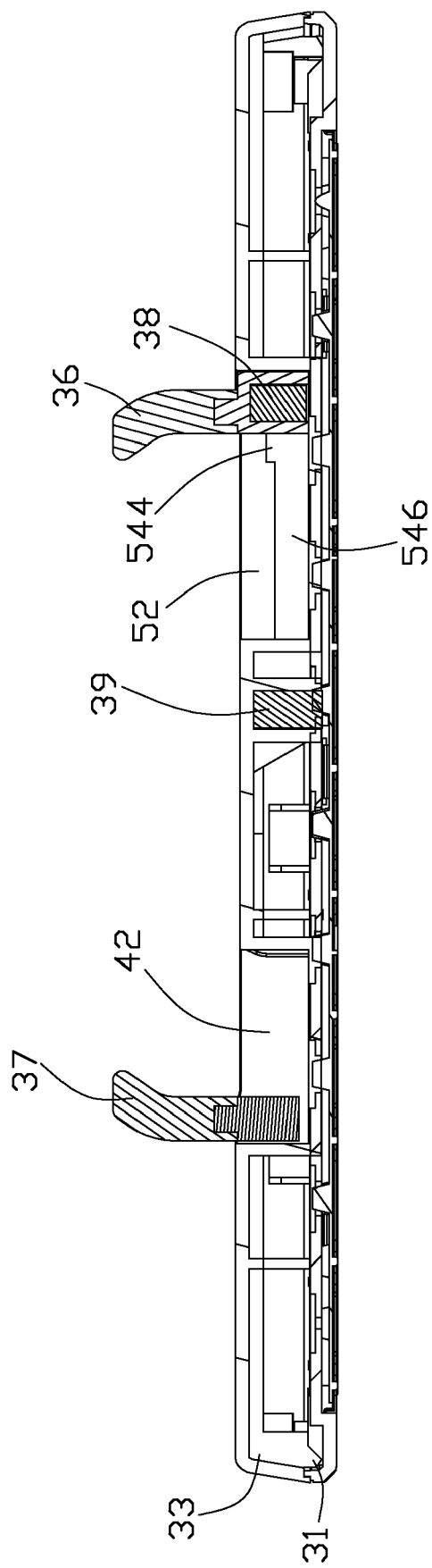
FIG. 7 is a cross-sectional view of FIG. 4.

Next, referring to FIG. 7, the main body 361 of the orientation block 36 is received in the latching groove 52 of the securing portion 50. The guiding cylinders 365 are received in the cutout 544. The located block 37 is received in the receiving groove 42 of the mounting portion 40. The posts 44 are respectively received in a given containing groove 375 so that the located block 37 is rotatably connected with the mounting portion 40. Finally, the key module 31 is assembled into the base 33, thereby finishing the assembled process.

In use, the orientation block 36 and the located block 37 are respectively rotated from the latching groove 52 and the receiving groove 42. At that time, the magnetic forces between the first magnet 38, in the orientation block 36, and the second magnet 39, in the receiving space 560, is strong enough so that the orientation block 36 slides along the sliding groove 45 until the orientation block 36 is moved to a stable position. After that, the external keypad 30 is placed on the mobile phone 20 so that the body 22 of the mobile phone 20 is received in the recessed portion 337 of the base 33. The orientation block 36 and the located block 37 are disposed at two sides of the body 22 of the mobile phone 20. Since the distance between the orientation blocks 36 and the located blocks 36 may be adjusted, the orientation block 36 and the located block 37 securely clamp the two sides of the body 22 of the mobile phone 20. Since the deformed portion 373 and the bended portion 363 are made of flexible material, the orientation block 36 and the located block 37 may fit all kinds of mobile phones, and provide a full frictional force to clamp the mobile phone 20.

A main advantage of the present fastener is that the orientation block 36 and the located block 37 of the fastener 35 clamps the two sides of the mobile phone 20. The positions of the located blocks 37 are adjusted by the magnetic forces between the first magnet 38 and the second magnet 39. Therefore, the orientation blocks 36 and the located blocks 37 may securely be clamp to the body 22 of the mobile phone 20. When the external keypad 30 is operated, the user may input information with both hands so as to control the mobile phone 20, thereby greatly improving data input speed. In addition, the fastener may prevent the external keypad 30 from being inadvertently disconnected from the mobile phone 20.

In an alternative embodiment, the mounting portion 30, the securing portion 50, the orientation block 36 and the located block 37 may come in pairs.

As described above, the present invention provides the fastener for use with various portable devices, beyond the mobile phone illustrated, and/or with other devices requiring fastener.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A fastener, comprising:
   a base, the base comprising a securing portion and a mounting portion;
   an orientation block, the orientation block slidably and rotatably connected to the securing portion;
   a located block, the located block being rotatably engaged in the mounting portion; and
   two magnets, one of the two magnets being disposed adjacent to the securing portion, the other magnet being disposed in the orientation block, the two magnets being attracted to each other and configured for adjusting a distance between the orientation block and the located block.

2. The fastener as claimed in claim 1, wherein the mounting portion defines a receiving groove at one side of the base, and forms a protrusion block at an opposite side of the base, and the located block is received in the receiving groove.

3. The fastener as claimed in claim 2, wherein the mounting portion has two posts extended into the receiving groove, the located block defines two containing grooves at two sides thereof, and the posts are respectively received in a corresponding containing groove.

4. The fastener as claimed in claim 1, wherein the securing portion defines a latching groove on one side of the base, and forms a latching block at an opposite side of the base, and the orientation block is received in the latching groove.

5. The fastener as claimed in claim 4, wherein the base has a latching portion disposed adjacent to one end of the latching block, the latching portion includes two spaced hooks and two boards, the two boards are disposed at two sides of the two hooks, and one of the magnets is disposed between the two boards.

6. The fastener as claimed in claim 5, wherein the orientation block defines an aperture at a bottom surface thereof configured for receiving the other of the magnets.

7. The fastener as claimed in claim 1, wherein the orientation block includes a main body and a bended portion, the main body is integrally formed with the bended portion by double molding, the located block includes a body and a deformed portion, and the body is integrally formed with the deformed portion by double molding.

8. The fastener as claimed in claim 7, wherein the bended portion and the deformed portion are made of flexible material, and the body and the main body are made of hard material.

9. A portable electronic device with a body section, comprising:
   an external keypad disposed to the body section;
   the external keypad comprising:
      a base attached to one side of the external keypad;
      an orientation block, the orientation block slidably and rotatably connected to the base; and
      a located block, the located block being rotatably connected to the base;
   wherein a distance between the orientation block and the located block is capable for adjusting under a magnetic force, and the orientation block and the located block is configured for clamping the body section so as to fix the external keypad to the portable electronic device.

10. The portable electronic device as claimed in claim 9, wherein the orientation block includes a main body and a bended portion, the bended portion is integrally formed with the main body by double molding, the located block includes a body and a deformed portion, and the body is integrally formed with the deformed portion by double molding.

11. The portable electronic device as claimed in claim 9, wherein the base includes a securing portion, the securing portion defines a receiving groove, a cutout and a sliding groove, and forms a protrusion block at an opposite side of the base, the receiving groove, the cutout and the sliding groove communicate with each other, and the orientation block has two guiding cylinders configured for being received in the cutout and the sliding groove.

12. The portable electronic device as claimed in claim 9, wherein the base includes a mounting portion, the mounting portion defines a latching groove at one side of the base, and forms a latching block at an opposite side of the base.

13. The portable electronic device as claimed in claim 12, wherein the base has a latching portion at one side of the latching block, the latching portion includes two spaced hooks and two boards, the boards are disposed at one side of the two hooks.

14. The portable electronic device as claimed in claim 13, further comprising two magnets, one magnet is disposed between the board and the latching block, and the orientation block defines an aperture configured for receiving the other magnet.

* * * * *